United States Patent [19]

Bergqvist

[11] Patent Number: 5,231,681
[45] Date of Patent: Jul. 27, 1993

[54] OPTICAL FIBRE CABLE FOR DETECTING A CHANGE IN TEMPERATURE

[75] Inventor: Erik A. Bergqvist, Bergsjö, Sweden

[73] Assignee: Telefonaktiebolaget LM Ericsson, Stockholm, Sweden

[21] Appl. No.: 980,099

[22] Filed: Nov. 23, 1992

Related U.S. Application Data

[63] Continuation of Ser. No. 797,937, Nov. 26, 1991, abandoned.

[30] Foreign Application Priority Data

Dec. 14, 1990 [SE] Sweden .................... 9004005
Apr. 24, 1991 [SE] Sweden .................... 9101237

[51] Int. Cl.$^5$ .................................. G02B 6/26
[52] U.S. Cl. .............................. 385/13; 385/32
[58] Field of Search .................. 385/12, 13, 140, 100, 385/102, 103, 104, 32; 356/43, 44; 250/227.14

[56] References Cited

U.S. PATENT DOCUMENTS

| | | | |
|---|---|---|---|
| 4,151,747 | 5/1979 | Gottlieb et al. | 356/44 |
| 4,472,628 | 9/1984 | Whitten | 250/227.14 |
| 4,654,520 | 3/1987 | Griffiths | 250/227 |
| 4,729,627 | 3/1988 | Saito et al. | 385/13 |
| 4,880,970 | 11/1989 | Jones | 250/227 |
| 5,090,818 | 2/1992 | Kleinerman | 356/44 |

FOREIGN PATENT DOCUMENTS

| | | |
|---|---|---|
| 0066493 | 12/1982 | European Pat. Off. |
| 62-69131 | 3/1987 | Japan |
| 62-69132 | 3/1987 | Japan |
| 2183026 | 5/1987 | United Kingdom |

OTHER PUBLICATIONS

Patent Abstracts of Japan, vol. 2, No. 127, abstract of JP-53-107381, publ. Sep. 19th, 1978, Hitachi Densen K.K.
Patent Abstracts of Japan, vol. 10, No. 232 (P-486), abstract of JP-61-066133, publ. Apr. 4th, 1986, Agency of Ind Science & Technol.
Patent Abstract of Japan, vol. 11, No. 177 (P-583), abstract of JP-62-006128, publ. Jan. 13th, 1987, Mitsubishi Electric Corp.

Primary Examiner—John D. Lee
Assistant Examiner—John Ngo
Attorney, Agent, or Firm—Burns, Doane, Swecker & Mathis

[57] ABSTRACT

An optical fibre cable for temperature detection comprises an optical fibre and a temperature-responsive swellable body. The fibre and the swellable body are held together by a helically-wound wire. The swellable body includes an elastic tube which contains wax having a given melting point. When the wax melts, it expands in volume and causes the tube to swell and therewith stretch the wire, resulting in the bending of the optical fibre. The fibre cable (6) is used in an OTDR-system. The propagation of light pulses is measured and a heated section of the fibre cable is detected through the detection of attenuated, reflected light pulses. A desired light attenuation in a range of from 0.01–0.1 Db/m can be obtained by appropriate selection of the parameter values of the fibre cable for example the pitch of the wire helix and the volumetric expansion of the wax. This enables the locations of several heated sections along the fibre cable to be established.

8 Claims, 8 Drawing Sheets

OPTICAL FIBRE CABLE FOR DETECTING A CHANGE IN TEMPERATURE

This application is a continuation of application Ser. No. 07/797,937, filed Nov. 26, 1991, now abandoned.

TECHNICAL FIELD

The present invention relates to an optical fibre cable for detecting a change in temperature, said fibre cable including an elongated temperature-responsive device and an optical fibre in abutment with said temperature-responsive device and fastened thereto by means of a fastening device which embraces the fibre and the temperature-responsive device, wherein a light pulse transmitted into a non-influenced fibre cable from one end thereof is attenuated generally uniformly along the length of the fibre and wherein the light pulse is further attenuated when the optical fibre is bent by the temperature-responsive device.

BACKGROUND ART

When an optical fibre is subjected to an external force, the fibre will bend and result in attenuation of the light. This is a drawback in signal transmission for example, although bending of the fibre can be utilized in a manner which enables the fibre to be used as a detecting element. One example of such a force detecting element is found described in the European Patent Specification No. 0188512. This specification teaches an optical fibre comprising a core and cladding which is surrounded by a primary protector and a twisted band which is placed between the cladding and the primary protector. The twisted band causes the mentioned bending when the primary protector is subjected to force.

A fibre cable which is used to detect temperature is described and illustrated in the Japanese Patent Application No. 60-195429. In this case, there is wound around the cladding of the optical fibre a wire which is made of a shape memory metal and which contracts when subjected to a given detecting temperature and therewith exerts pressure on the cable cladding, causing the fibre to bend. Due to so-called Rayleigh-scattering, each molecule in the fibre core reflects light, and the intensity of the reflected light is directly proportional to the intensity of the passing light pulse. The intensity of the reflected light pulse decreases as a result of bending of the fibre. The reflected light pulse can be detected and the location of the bend along the fibre can be established with the aid of so-called OTDR, Optical Time Domain Reflectometry. One drawback with this technique is that it is often very difficult to find a shape memory metal which will cause the cable fibre to bend to the desired extent at a desired temperature. The manufacture of the device itself is also relatively complicated.

A further example of an optical fibre cable for temperature detection is described and illustrated in Japanese Patent Application No. 62-6128. In this case, an optical fibre is attached to a straight rod of shape memory metal with the aid of wire ties which are tied around the rod and the optical fibre. When the device is subjected to a selected detection temperature, the rod will fold into a zig-zag shape and therewith bend the optical fibre.

DISCLOSURE OF THE INVENTION

According to the present invention, the inventive fibre cable includes an optical fibre which is fastened to a temperature-responsive swellable body. The swellable body is a narrow tube that contains a material which will greatly expand in volume within a relatively small temperature range. The fibre is attached to the swellable body by means, for example, of a wire which is wound helically around the body and the optical fibre. The body will expand when subjected to a temperature change, such as to stretch the wire around the fibre. As a result, the fibre is bent at each turn of the wire so as to cause elevated attenuation of the light conducted by the optical fibre.

The invention is characterized by the characterizing features set forth in the following claims.

BRIEF DESCRIPTION OF THE DRAWINGS

An exemplifying embodiment of the inventive fibre cable will now be described in more detail with reference to the accompanying drawings, in which

FIG. 11c is a perspective view of an alternative embodiment of the band in FIG. 11a;

BEST MODE OF CARRYING OUT THE INVENTION

Figure 1:
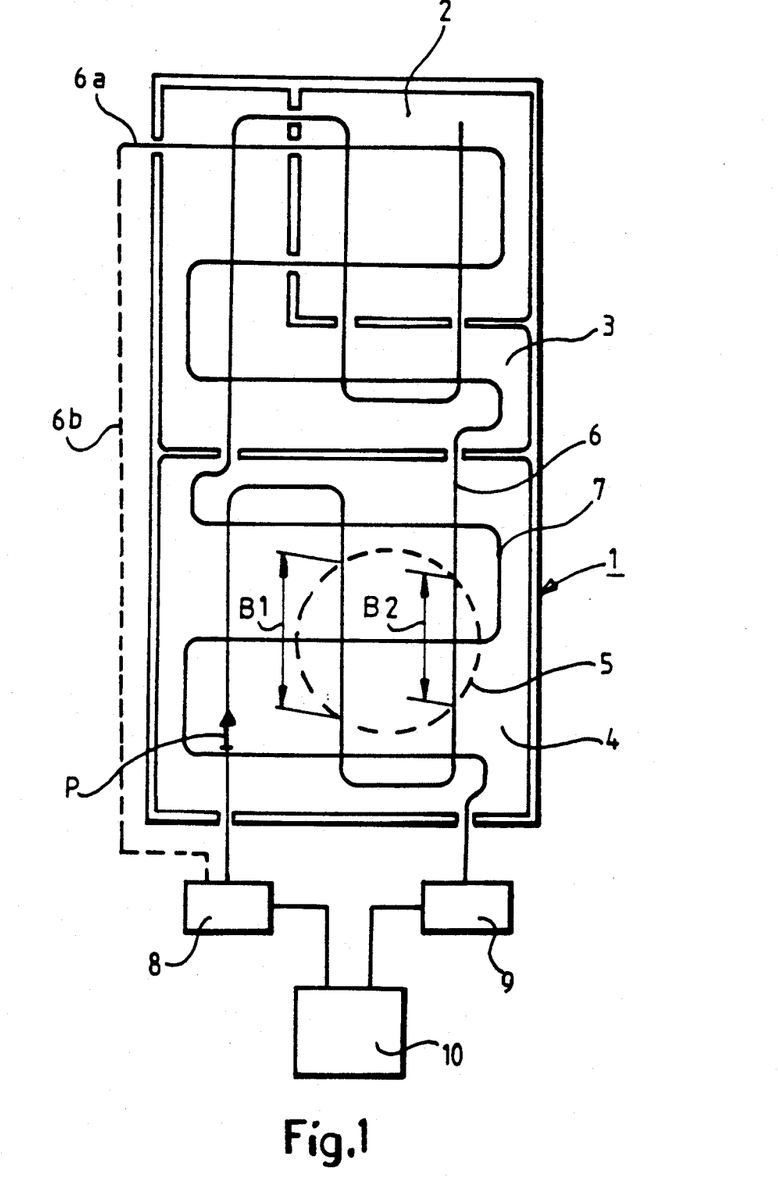
FIG. 1 illustrates schematically a building structure equipped with the fibre cable and a monitoring system.

Illustrated schematically in FIG. 1 is a building structure 1, for example a greenhouse, whose temperature shall be monitored. The greenhouse is divided into several compartments 2, 3, 4 and it is of interest to be able to monitor the temperature of each compartment individually. It may also be of interest to be able to detect when the temperature of a small area 5 of a particular compartment increases to a level at which the plants in this part of the compartment are liable to become damaged. It may be of interest to monitor the compartments for other reasons, for example fire monitoring. Monitoring of the compartments is effected with the aid of temperature-responsive optical fibre cables 6 and 7 which are connected to an OTDR-system 8, 9 provided with a control unit 10. OTDR stands for Optical Time Domain Reflectometry and, in brief, operates by transmitting light pulses of short duration through the fibre from its one end. When the fibre is subjected to an external force within one area of the fibre, attenuation of the light in the fibres increases as a result of bending of the fibre. As a result of the aforesaid Rayleigh-scattering, the light pulses are reflected back to the end of the fibre and the reflected light pulses are attenuated in the area affected. The reflected pulses are detected and the location of the external force can be determined by measuring the pulse propagation time. A more comprehensive description of OTDR is found, for instance, in the U.S. Pat. Nos. 4,463,254 and 4,713,538.

Figure 2:
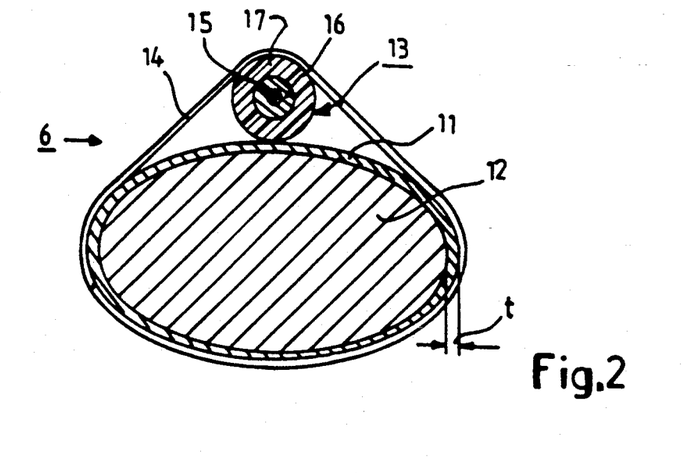
FIG. 2 is a cross-sectional view of the fibre cable.
Figure 3:
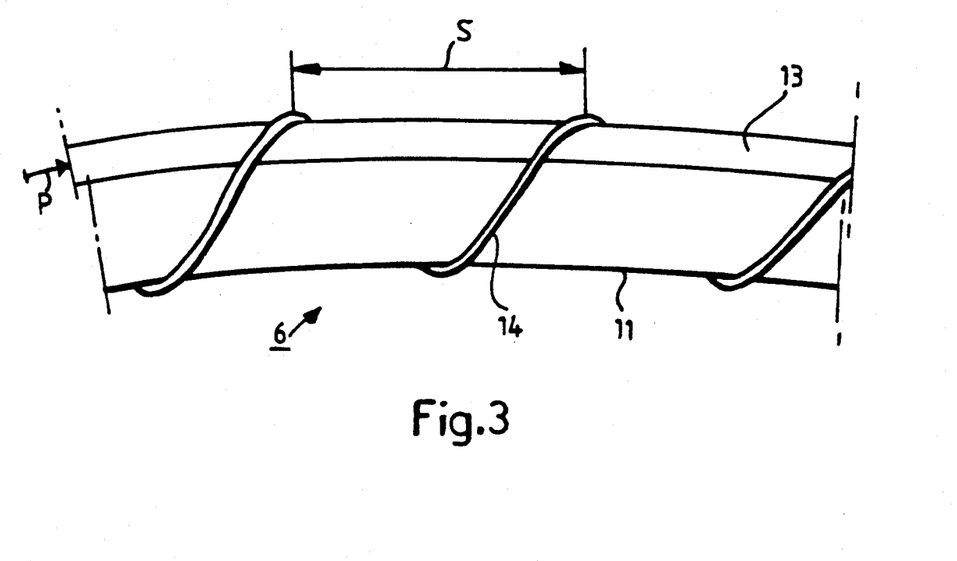
FIG. 3 illustrates the fibre cable in a relatively cold state.
Figure 4:
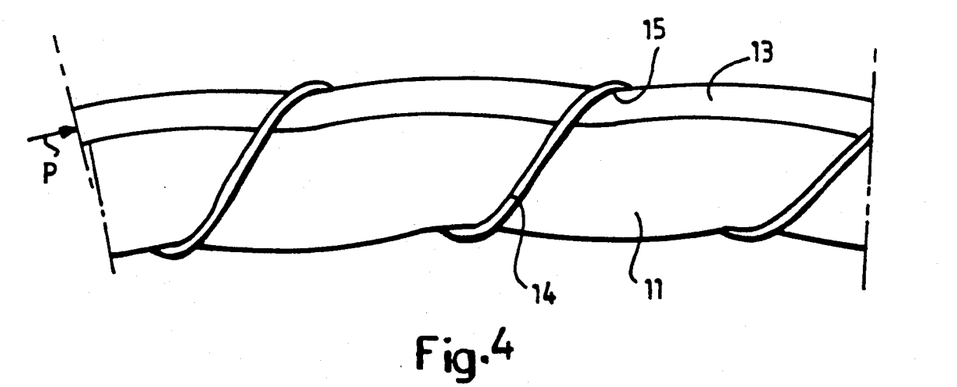
FIG. 4 illustrates the fibre cable in a relatively heated state.

An exemplifying embodiment of the inventive optical fibre cables 6 and 7 will now be described in more detail. FIG. 2 is a cross-sectional view of the inventive fibre cable. This cable includes a plastic tube 11 which contains a detector material 12, which in this particular case is wax, an optical fibre 13 and a wire 14 which is wound around the fibre 13 and the plastic tube 11. The optical fibre is a conventional multimode fibre having a core 15 of diameter 50 $\mu$m and a core cladding of diameter 125 $\mu$m, the primary covering 17 of which has an outer diameter of 250 $\mu$m. In its round state, the plastic tube has a diameter of 1.0 mm and a wall thickness t of about 0.07 mm. For reasons made apparent herebelow, the amount of wax 12 contained by the plastic tube 11 is solely sufficient for the tube 11 to obtain an oval cross-sectional shape when the wax is in a solid phase. The wire 14 is wound helically around the plastic tube 11 and the fibre 13, as shown in FIG. 3. The wire winding has a pitch S, which in the illustrated embodiment equals 2 mm. The wax material has a relatively small coefficient of cubic expansion in its solid state. The volume of the wax greatly increases when the wax melts. The wax material chosen for the illustrated embodiment has a melting temperature T1 of 60° C., and the volume of the wax will increase by 16% when the wax melts. The coefficient of cubic expansion has a relatively small value above the wax melting point. The plastic tube is elastic and is expanded by the expanding wax. When heated to a temperature above the melting point of the wax, the expanded plastic tube 11 will bend the optical fibre 13, as shown in FIG. 4. The fibre 13 is held firmly by the wire 14, and the expanded plastic tube 11 forces the fibre to protrude out between the turns of the wire. The fibre 13 is bent at the abutment points 15 between the wire 14 and the fibre 13, such as to increase the attenuation of light in the fibre, as will be explained in more detail with reference to FIGS. 5 and 6.

Figure 5:
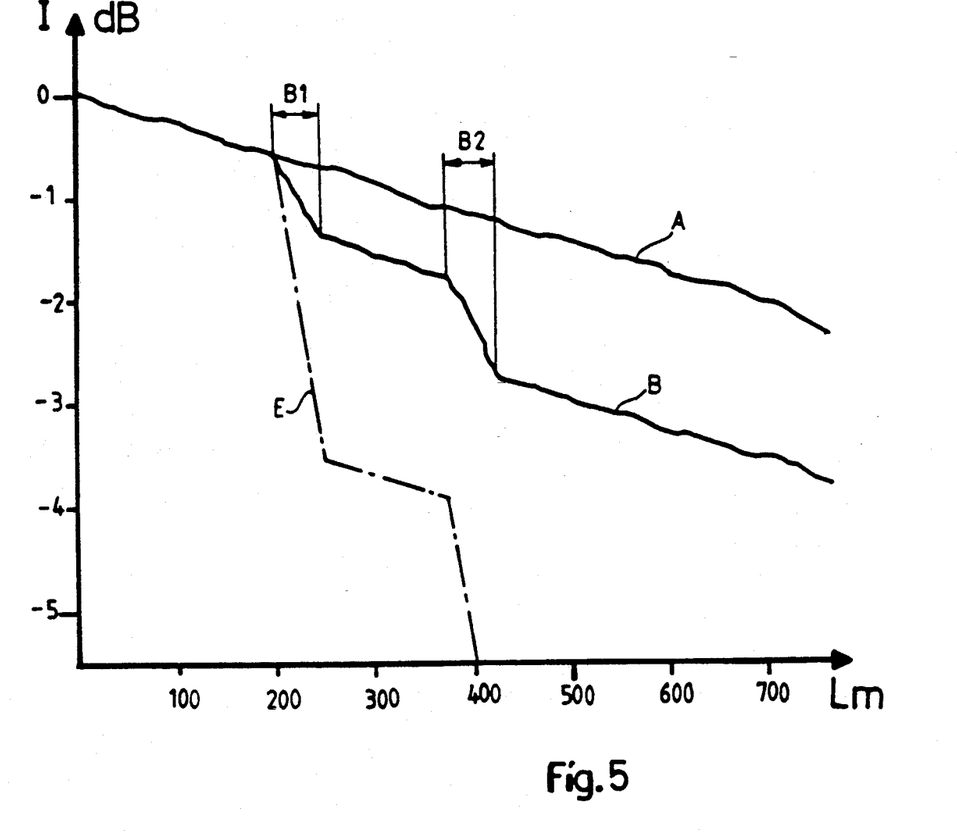
FIG. 5 illustrates attenuation of a light pulse along the fibre cable.
Figure 6:
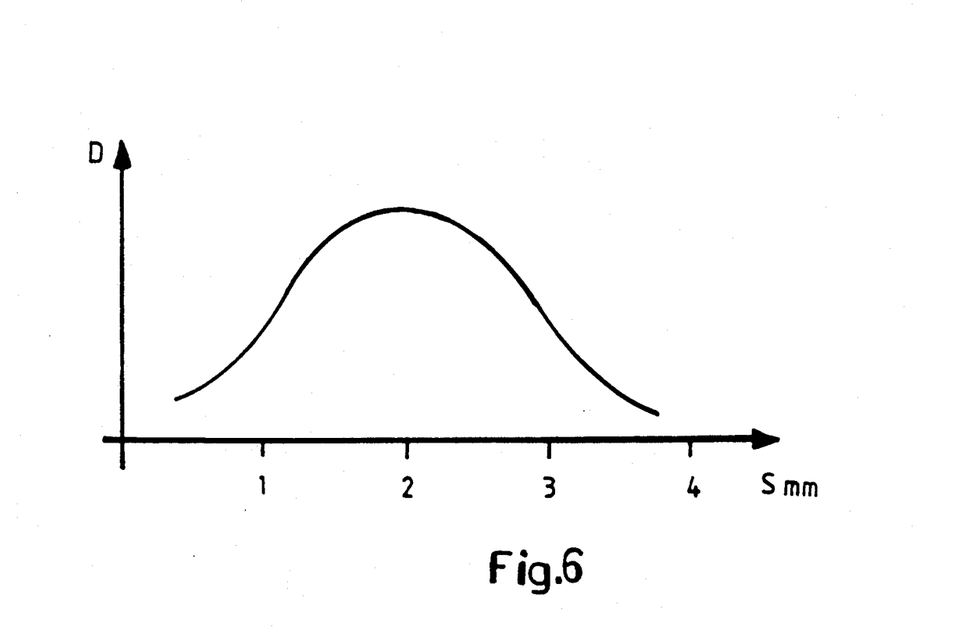
FIG. 6 is a diagram which shows the dependency of fibre-cable attenuation on the pitch of the wire winding.

FIG. 5 is a diagram which shows the intensity I of the light along the length L of the fibre cable 6 of a light pulse P transmitted from the OTDR-unit 8 shown in FIG. 1. The intensity is given as attenuation in dB/m and the length L is given in meters. A curve A illustrates attenuation of the light in the fibre cable 6 when the cable is in a non-influenced state, i.e. when the temperature in the compartments 2, 3 and 4 lies beneath T1. A curve B illustrates attenuation of the light pulse P when the temperature in the area 5 exceeds the temperature T1.

The wax 12 and the plastic tube 11 swell in the area 5, corresponding to a fibre-cable interval B1 and B2, causing the optical fibre to bend and therewith resulting in increased attenuation of the light pulse P. It is essential that the increased attenuation will have a value of such magnitude as to ensure that the Rayleigh-reflecting pulse can be positively detected and distinguished from among other disturbances occurring, e.g., as a result of the normal attenuation variations of the optical fibre. It is also essential that attenuation per meter is not excessively powerful, since it is desired to detect several intervals of elevated temperature along the fibre, such as the intervals B1 and B2 for instance. When the attenuation of the light with each unit of length is very powerful, as illustrated by a curve E, attenuation of the lightwave P will be so powerful as to enable only the first interval B1 to be detected.

The bending to which the optical fibre 13 is subjected is normally called macrobending, as distinct from microbending. Microbending is said to occur when the distance between the fibre bends is smaller than one fibre diameter and that macrobending occurs when the distance between fibre bends is greater than one fibre diameter. In the case of the illustrated embodiment in which S=2 mm and the diameter of the fibre is 250 $\mu$m, macrobending is obtained according to this definition.

The desired attenuation in the fibre 13 is influenced by several parameters, such as the increase in volume of the wax 12 when it melts, the pitch S of the helically-wound wire 14, the amount of wax contained by the plastic tube 11, the oval shape of the tube, which is due to its wax content, and to the initial tension of the wire 14 wound around the non-influenced fibre cable. As is to be expected, a wax whose volume increases greatly when the wax melts will cause pronounced attenuation of light in the optical fibre 13. The attenuating effect of the pitch S is shown, at least schematically, in FIG. 6. This Figure is a diagram in which D shows light attenuation per meter of fibre cable 6 and S shows the pitch of the wire winding, as before mentioned. In the chosen embodiment, the fibre cable 6 has maximum light attenuation when S=2 mm. When the plastic tube contains a relatively small amount of wax, the tube will obtain a pronouncedly elongated oval shape in cross-section. In this case, the effect on the optical fibre 13 when the wax melts will be relatively small. With increasing quantities of wax, the cross-sectional shape of the tube successively approaches a circular shape and the influence on the fibre 13 will increase. It is necessary for the tension of the wire 14 to be such as to ensure that the fibre 13 will be truly bent when the wax 12 melts and expands. It is important, however, that the wire tension is not excessively high in the non-influenced state of the fibre cable. A high wire tension will cause high initial attenuation in the fibre 13 and make it difficult to detect the additional attenuation that occurs in the fibre cable 6 at elevated temperatures.

A desired value of the light attenuating effect of the influenced fibre cable 6 is determined simplest by measurement. An obtained attenuation value which deviates from the desired value is changed by a change in one or more of the fibre cable parameters, in accordance with the aforegoing. In a non-influenced state, the optical fibre 13 attenuates the light intensity I by 3 dB/km, as can be read from FIG. 5. When the fibre cable 6 is heated to a temperature above the melting point of the wax 12, the optical fibre of the illustrated embodiment has a desired light attenuation value in the order of 0.04 dB/m. In many applications, it is desirable to obtain attenuation in the range of 0.01–0.1 dB/m for the temperature-responsive fibre cable 6.

Figure 7:
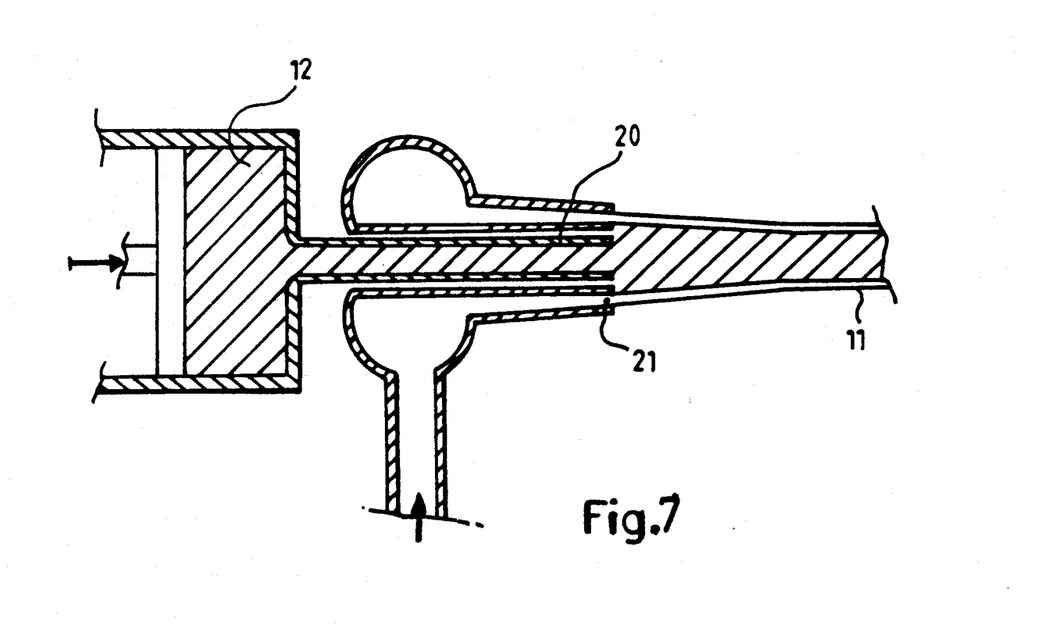
FIG. 7 is a schematic cross-sectional view of an extrusion nozzle for the extrusion of wax-filled plastic tubes.

As mentioned above with reference to FIG. 2, there are reasons why the plastic tube 11 shall be filled with solely enough wax 12 for the tube to have an oval cross-sectional shape when in a cold state. These reasons are partially due to the method applied in the manufacture of the tube. FIG. 7 illustrates schematically an extrusion nozzle having an internal cylindrical nozzle 20 and an outer annular gap 21. Plastic material for manufacture of the tube 11 is pressed through the gap 21 and the manufactured tube is filled with wax material 12 through the nozzle 20 at the same time as the tube 11 is drawn through said gap. At this instance, the wax material is in a molten form and when the wax cools, it will shrink so as to draw the tube into the oval shape shown in FIG. 2. The tube 11 can also be given an oval cross-section when the wax is in its molten state, by controlling the amount of wax delivered to the tube.

Figure 8:
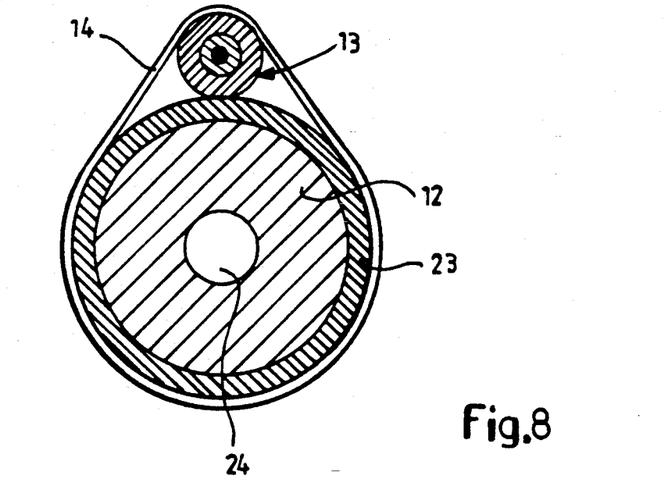
FIG. 8 is a cross-sectional view of a fibre cable provided with a thick-walled plastic tube.

In order to ensure that the tube 11 will be given an oval shape when the wax 12 solidifies, it is preferred that the wall of the tube will be sufficiently thin for this purpose, for instance have a diameter of 1.0 mm and a wall thickness of $t = 0.07$ mm in accordance with the aforedescribed embodiment. If the wall thickness of the tube exceeds the value $t = 0.1$ mm, the tube will retain its circular cross-section, as shown in FIG. 8 in the case of a tube 23. As the wax 12 in this tube solidifies, when the tube has been drawn in accordance with FIG. 7, a so-called suction hole 24 will occur. When the wax in the fibre cable again melts and a raise in temperature shall be indicated, the suction hole 24 is filled with wax and the tube 23 will then, and only then, begin to swell and therewith to bend the optical fibre 13. A swellable body constructed according to FIG. 8 will therefore have a relatively small effect on the optical fibre 13.

Figure 9:
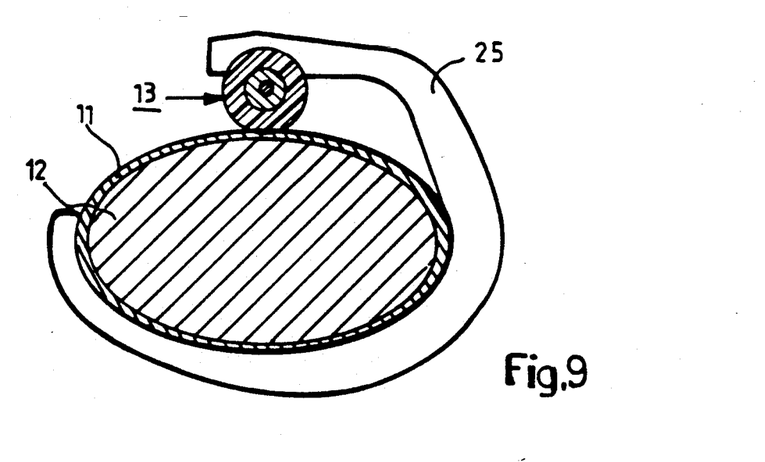
FIG. 9 is a cross-sectional view of the fibre cable provided with a clip for holding the plastic tube and the optical fibre together.

FIG. 9 illustrates an alternative to the helically-wound wire 14 for holding the fibre cable together. A clip 25, for instance a plastic clip, has a leg which fits around the plastic tube 11 and a leg which fits around the optical fibre 13 and holds the fibre in abutment with the tube 11. The clips 25 are placed along the fibre cable at a desired spacing therebetween, such as to provide suitable attenuation of the light in the fibre when the wax 12 melts in the tube 11. Attenuation of the light can be influenced by using resilient clips.

Figures 10A, 10B:
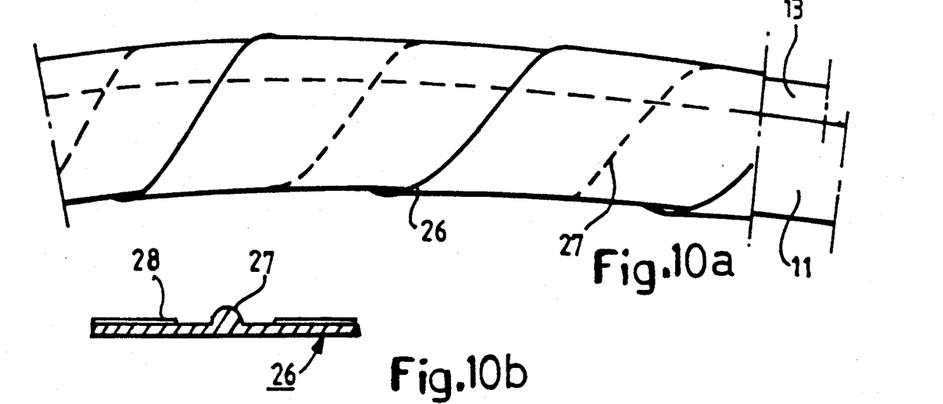
FIG. 10a shows the fibre cable provided with a helically-wound holding band.
FIG. 10b shows the band in cross-section.

Another alternative to the helically-wound wire 14 is illustrated in FIGS. 10a, b, 11a, b, c and 12. FIG. 10b is a cross-sectional view of a band 26 having a longitudinally extending spine 27. The band 26 is wound helically around the wax-filled tube 11 and the optical fibre 13, as illustrated in FIG. 10a. The spine 27 is turned inwards and lies against the tube 11 and the fibre 13 and causes the fibre to bend when the wax 12 melts and expands the tube 11. The band 26 has the form of an adhesive tape, coated with adhesive 28 on its inwardly facing side, such as to secure the band to the fibre cable.

Figures 11A, 11B:
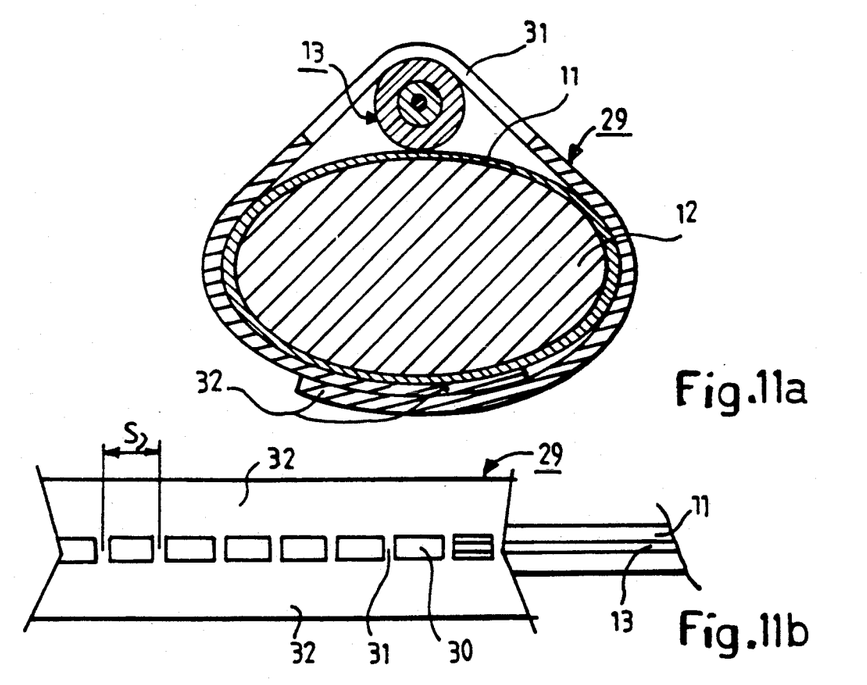
FIG. 11a is a cross-sectional view of the fibre cable provided with a longitudinally extending holding band.
FIG. 11b illustrates one embodiment of the band in FIG. 11a from above.
Figure 11C:
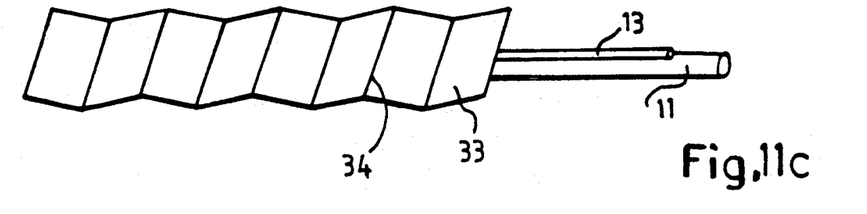

FIG. 11a is a cross-sectional view of the fibre cable with the tube 11 and the optical fibre 13. The tube and the fibre are embraced by a longitudinally extending holding band 29 whose edge parts 31 mutually overlap on the underside of the tube along the length of the tube. The band is provided with an adhesive substance on one side thereof and is taped firmly along the tube 11 and the fibre 13. FIG. 11b shows the band 29 from above. The band is provided with apertures 30 and intermediate strips 31 which are mutually spaced apart at a distance S. These strips, or imperforate parts, lie against the optical fibre, as illustrated in FIG. 11a, and bend the fibre when the tube 11 expands. FIG. 11b also shows a small part of the tube 11 and the fibre 13, in order to illustrate how the band 29 is placed prior to being wrapped around the fibre 13 and the tube 11. FIG. 11c is a perspective view of the tube 11 and the fibre 13 with a folded or pleated band 33, which is an alternative to the band 29. The pleated band 33 extends along the fibre cable and is wrapped around the fibre 13 and the tube 11 in a manner corresponding to the band 29. Pleats 34 in the band 33 form transverse reinforcements which lie against the optical fibre 13 and bend the fibre when the tube 11 expands as a result of being heated.

Figure 12:
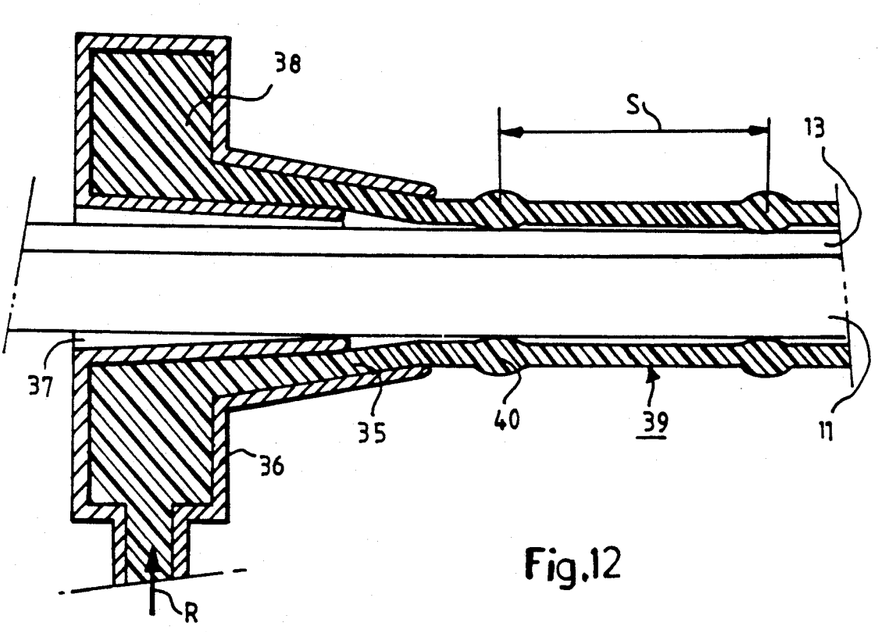
FIG. 12 is a cross-sectional view of an extrusion nozzle and a fibre-cable holding casing.

FIG. 12 illustrates schematically an extrusion nozzle having an annular gap 35, an annular chamber 36 and a central opening 37. Plastic material 38 is supplied to the annular chamber 36 at a given pressure R. The plastic material 38 is extruded through the gap 35 in the form of a tubular casing 39 which surrounds the tube 11 and the optical fibre 13, said tube and fibre being drawn through the opening 37. The wall thickness of the casing 39 can be varied by varying the pressure R, so as to obtain circular ridges 40 at a distance S apart. These ridges form in the casing 39 stiffenings which are capable of bending the optical fibre 13 when the tube 11 expands in response to an increase in temperature.

According to the aforedescribed embodiment, the tube 11 is filled with wax. According to an alternative embodiment, the tube may be filled with stearin and in accordance with a further embodiment water may be used, which expands by about 10% when freezing. The aforesaid detector materials each has a well-defined melting point, although it is also conceivable to choose materials or material mixtures which will melt within a given temperature range. The pitch S of the wire helix may have different values within different sections of the fibre cable 6, so as to obtain different light-attenuating properties in said sections.

Figure 13:
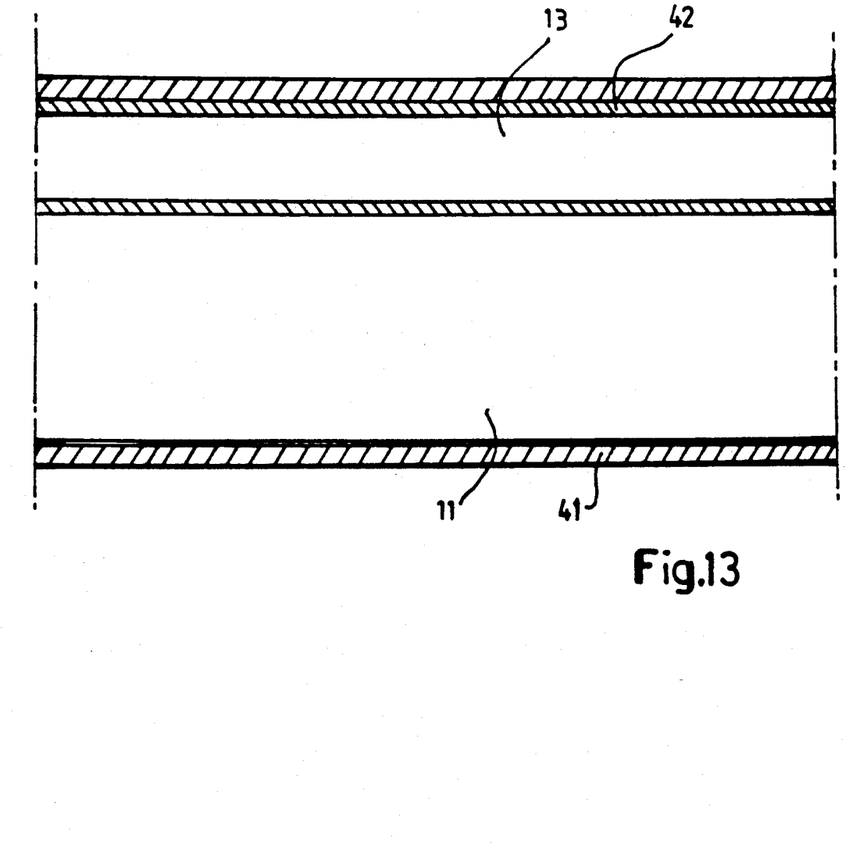
FIG. 13 is a longitudinal sectional view of an alternative embodiment of the invention.
Figure 14:
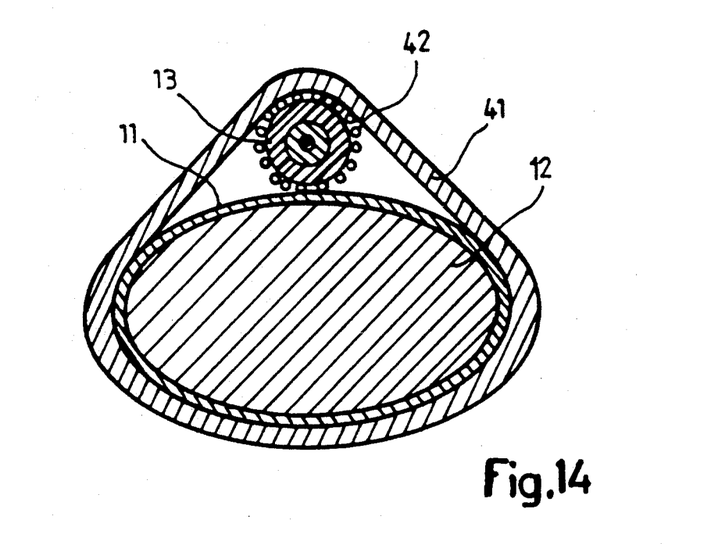
FIG. 14 is a cross-sectional view of the arrangement shown in FIG. 13.

According to one alternative embodiment, bending of the optical fibre 13 can be achieved by means of an arrangement illustrated in FIG. 13. In this embodiment, the fibre 13 and the wax-filled tube 11 are surrounded by a tubular casing 41, corresponding to the casing 39 but having a uniform wall thickness and lacking the ridges 40. The arrangement includes means for microbending the optical fibre 13. In the illustrated embodiment, said means has the form of small glass spheres 42 on the surface of the fibre 13, said spheres being in abutment with the outer surface of the wax-filled tube 11 and with the inner surface of the tubular casing 41, as shown in FIG. 14. The glass spheres 42 have a diameter within the range of 0.01–0.2 mm, for instance. When the wax 12 in the tube 11 melts and expands, the glass spheres 42 are pressed against the optical fibre 13 and cause microbending of the fibre. The fibre cable of the embodiments shown in FIGS. 13 and 14 is manufactured by coating the optical fibre 13 with an adhesive film, for instance a vaseline film. The fibre 13 is then coated with the glass spheres 42 and introduced together with the wax-filled tube 13 into the central opening 37 of the extrusion die shown in FIG. 12. The casing 41 is then extruded around the fibre 13 and the tube 11. When subjected to carefully performed experiments in the laboratory, a fibre cable according to the FIG. 14 embodiment exhibited the desired properties according to FIG. 5. The glass spheres 42 of the tested fibre cable had a diameter of 0.05 mm.

According to the above exemplifying embodiment, an OTDR-system was used to detect the reflected pulse in the inventive fibre cable 6. It is also possible to use this fibre cable and to detect the attenuated light pulse B at the distal end 6a of the fibre cable 6 shown in FIG. 1. The distal end of the cable is connected to the unit 8 by means of an optic fibre 6b, which is shown in the Figure by a broken line. In the illustrated embodiment, the attenuated light pulse P has an intensity I equal to −3.8 dB, according to curve B in FIG. 6. However, when the attenuated light pulse is detected, it is only possible to establish that the temperature has increased somewhere along the fibre, although the location of this temperature increase remains unknown. It may be of interest to know the location of this temperature increase and the location can be established relatively easily particularly when the two fibre cables 6 and 7 are used for detection purposes, as illustrated in FIG. 1.

The inventive fibre cable 6 has the advantage of being relatively easy to manufacture. The light attenuating properties of the cable can be varied relatively easily and can be chosen within a wide range. The fibre cable is very flexible and is unable to conduct electricity.

I claim:

1. An optical fibre cable for detecting a change in temperature, said fibre cable including an elongated temperature-responsive device and an optical fibre in abutment with said temperature-responsive device and fastened thereto by means of a fastening device which embraces the fibre and the temperature-responsive device, wherein a light pulse transmitted into a noninfluenced fibre cable from one end thereof is attenuated generally uniformly along the length of the fibre and wherein the light pulse is further attenuated when the optical fibre is bent by the temperature-responsive device, wherein the temperature-responsive device includes an elastic tube which contains a detector material whose coefficient of cubic expansion within a temperature detecting range, in which said detector material changes from one phase to another phase, has a value which exceeds the value of the coefficient of cubic expansion in adjacent temperature ranges.

2. An optical fibre cable according to claim 1, wherein the detector material is a wax material which expands upon conversion from a solid to a liquid phase.

3. An optical fibre cable according to claim 1, wherein the tube has an oval cross-sectional shape when the fibre cable is in its initial, noninfluenced state; and in that the tube is, in this state, completely filled with the detector material.

4. An optical fibre cable according to claim 1, wherein the fastening device is a wire wound helically around the optical fibre and the tube with a helix of desired pitch.

5. An optical fibre cable according to claim 1, wherein the fastening device is a tubular casing which embraces the optical fibre and the tube; and in that the wall of the casing has provided thereon thickenings in the form of circular ridges which are mutually spaced along the fibre cable at desired distances.

6. An optical fibre cable according to claim 1, wherein the fastening device includes a band which extends in the longitudinal direction of the fibre cable and which is wrapped around and embraces the tube and the optical fibre; and in that the band has abutments which abut the optical fibre at desired distances from one another.

7. An optical fibre cable according to claim 1, wherein the fastening device includes a tubular casing which embraces the optical fibre and the tube; and in that means for microbending the fibre are provided between the optical fibre and at least one of the outer surfaces of the tube and the inner surface of the tubular casing.

8. An optical fibre cable according to claim 7, wherein the means for microbending the optical fibre include spheres having a diameter of from 0.01 to 0.2 mm mounted on the optical fibre.

* * * * *